United States Patent [19]
Dixit et al.

[11] Patent Number: 5,109,458
[45] Date of Patent: Apr. 28, 1992

[54] CABLE SEAL

[75] Inventors: Mayankkumar M. Dixit, Basking Ridge; Raymond D. Smolen, Totowa Boro, both of N.J.

[73] Assignee: AT&T Bell Laboratories, Murray Hill, N.J.

[21] Appl. No.: 606,026

[22] Filed: Oct. 30, 1990

[51] Int. Cl.$^5$ .............................................. G02B 6/44
[52] U.S. Cl. ...................................................... 385/102
[58] Field of Search ...................................... 350/96.23

[56] References Cited
U.S. PATENT DOCUMENTS 4,767,176  8/1988  Pohl ........................... 350/96.23
4,787,702  11/1988  Khalil ......................... 350/96.23

OTHER PUBLICATIONS

*International Wire & Cable Symposium Proceedings 1989,* "Fiber-To-The-Home Update: Drop Installation Flexiblity," by G. S. Cobb, W. H. Bensel, and J. B. Haber and M. M. Dixit, pp. 149–154, Nov. 14, 1989.

*Primary Examiner*—William L. Sikes
*Assistant Examiner*—Robert E. Wise
*Attorney, Agent, or Firm*—Ruloff F. Kip, Jr.

[57] ABSTRACT

A device for sealing passage of cable through an opening in a wall comprises (a) an elastomeric grommet having therein an axial bore and a radial slit extending to such bore from the grommet's outer surface, and (b) a clamp comprising a belt of which a segment forms a loop around the grommet, and a take-up adapted by adjustment to contract or expand such loop. In use, a portion of a cable is inserted through the slit into the bore, the grommet is positioned within the wall opening and the take-up is operated to contract the loop to pressurize the grommet material to thereby seal (c) the cable portion in the bore, (d) the slit and (e) the interface of the grommet and wall. Prior to such use, the bore contains a removable plug joined to the grommet by a ring of tearable material. The grommet has thereon first and second flanges adapted to, respectively, provide strain relief for the cable and aid in retaining the grommet in the wall opening. In a variant, the device has three axial bores and three corresponding radial slits permitting passage of three cables through such opening.

3 Claims, 5 Drawing Sheets

FIG. 9

CABLE SEAL

FIELD OF THE INVENTION

This invention relates generally to means for providing seals for the passage of cables through walls or the like and more particularly, to seals of such kind in which grommets comprising elastomeric material are untilized to provide or contribute to the sealing effect.

BACKGROUND OF THE INVENTION

U.S. Pat. No. 4,332,435 issued Jun. 1, 1982, in the name of Jan Post to N. K. F. Groep B. V., Netherlands for "Glass Fiber Cable" discloses an arrangement wherein optical fibers of two separate optical cables are coupled together by splices contained within the housing of a junction box. These cables are introduced into the box by their passages through respective openings in end plates of the box and then into the space enclosed by the housing.

For cable strain relief purposes, a feed-through bush is inserted from the inside of the box into the opening in each plate to pass through and beyond that opening. The bush contains the cable and has shoulders bearing against the inside wall surface of that plate. The bush contains a gasket adjacent to such plate and encircling the cable in such opening. A union disposed in such bush outward of the gasket (and also encircling the cable) is threadedly engaged with the bush to be adapted by turning of the union to compress the gasket to thereby clamp the cable in and to the bush. By virtue of that clamping and of the bearing of the bush shoulders against the mentioned end plate, the cable portion inside the box will be relieved of strain from pulling force exerted on the cable outside the box. The passage of the cable through the end plate opening is sealed by a water-tight envelope shrunk onto the bush on the outside of the box.

While the described arrangement provides a seal for the passage of the cable through the wall opening, it has the disadvantages that it is expensive in construction, requires that the cable be passed through the bush by end entry rather than side entry thereinto, will not accommodate to the extent desirable a range of variation in cable diameter, cannot be used as a seal in the absence of the cable and cannot be used for passage of more than one cable through the same opening.

SUMMARY OF THE INVENTION

One or more of the mentioned disadvantages are overcome according to the invention hereof in one of its aspects by providing a cable seal comprising a grommet comprising elastomeric material and having an axis and having therein at least one axial bore and at least one radial slit extending from the outside of said grommet to said bore, the sides of said slit being resiliently spreadable apart to permit, when said bore is empty, insertion from the side of said grommet through said slit into said bore of a lengthwise central portion of a section of a cable, the cable seal further comprising means to pressurize such grommet material so as to seal said slit and to produce a pressure sealing in said bore of said cable portion.

Consonant with the above, the grommet may have therein a plurality of axial bores and a corresponding plurality of non-intersecting radial slits for insertion from the side of the grommet into such bores of lengthwise central portions of sections of respectively corresponding cables.

According to the invention in another of its aspects, a cable seal may be provided by a grommet comprising elastomeric material and having therein at least one axial bore for reception therein of a lengthwise central portion of a section of a cable, and in which such grommet has thereon a stop flange adapted in use to provide strain relief for such cable.

Further according to the invention in still another of its aspects, a cable seal may be provided by a grommet comprising elastomeric material and having therein a least one axial bore, adapted, when empty, to receive the mentioned lengthwise central cable portion, the bore having therein a plug attached to the body of the grommet by a ring of material which is tearable to permit removal of the plug from the bore but which, if left intact by non-removal of the plug, provides a seal for the discontinuity between the bore wall and plug to thereby permit the grommet to be used as a seal for an opening into which it is inserted even though no cable portion is contained in the bore.

BRIEF DESCRIPTION OF THE DRAWING

For a better understanding of the invention, reference is made to the following description of exemplary embodiments thereof, and to the accompanying drawings wherein.

DETAILED DESCRIPTION

Figure 1:
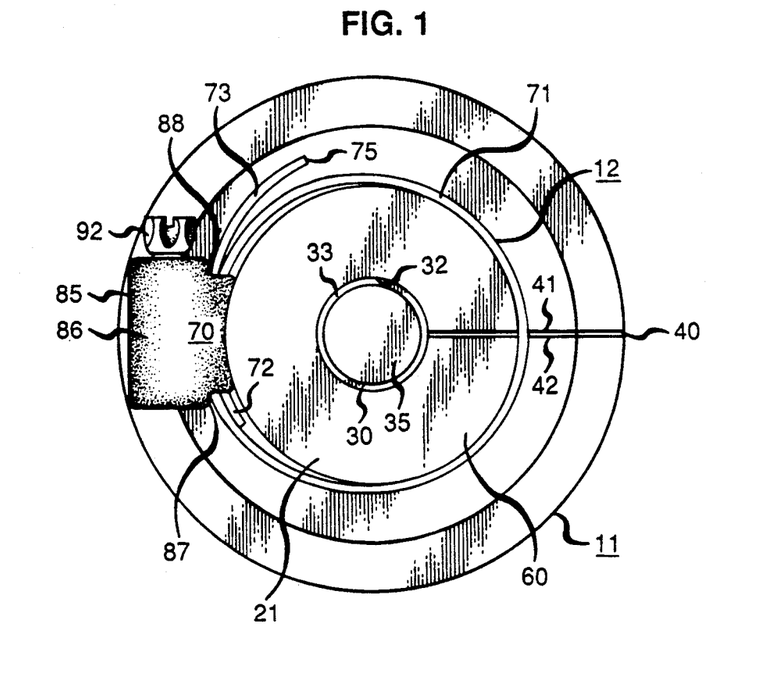
FIG. 1 is a left-side elevation of a cable seal according to the invention and having one axial bore and radial slit therein.
Figure 2:
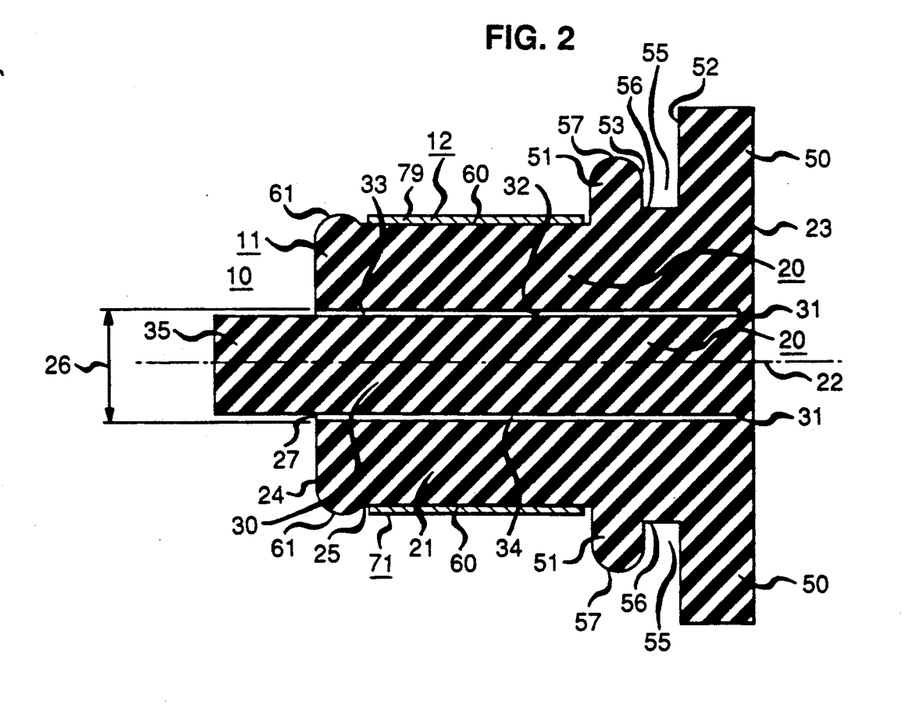
FIG. 2 is a front elevation in cross section of the FIG. 1 seal.

Referring now to FIGS. 1 and 2, the reference numeral 10 designates a cable seal according to the invention which has one axial bore therein, and which consists of a grommet 11 and a clamp 12.

Grommet 11 is constructed of an elastomeric material 20 which consists of polyvinyl chloride and fillers to modify the porperties of the former. Structurally speaking, the grommet comprises a resilient body 21 having an axis 22 and front and rear ends 23, 24 and a peripheral outer surface 25 extending between such ends and around such axis. The grommet peripheral surface 25 conforms in shape to a surface of revolution taken around grommet axis 22.

The grommet has formed therein a single circular cylindrical bore 26 extending coaxially with axis 22 from a bore opening 27 at the grommet's rear end forwardly through the grommet. When the grommet is in use as a cable seal, bore 26 extends all the way through the grommet to a bore opening at the grommet's front end 23. Prior to such a use, however, the bore 26 has therein a plug 30 of the same elastomeric material 20 as the grommet body, and the bore stops short of grommet end 23 and is separated from that end by a ring 31 of such material extending around the plug and having its radially interior and outer sides joined to and integral with, respectively, the plug 30 and the part of grommet body 21 adjacent to the interior circular cylindrical bounding wall 32 of the bore. As later discussed more fully, the material of ring 31 is tearable by movement of plug 30 in response to axially directed force applied to that plug.

The plug 30 is separated from bore wall 32 by a discontinuity 33 depicted in FIGS. 1 and 2 as provided by an annular gap 34 of small radial thickness existing between the surfaces of the plug and of the bore wall. If desired, however, plug 30 may have a slide fit with no clearance in bore 26 so that, while there is still a discontinuity between the plug and the bore wall, no gap exists between them.

As shown, the plug 30 extends rearwardly from the rear bore opening 27 to have a free end 35 exposed to the rear of grommet body 21. Such free end provides a convenient site for application to plug 30 of the mentioned force.

The grommet 11 does not extend continuously in the angular direction around its axis 22. Instead, the grommet has formed therein (FIG. 1) a slit 40 extending in the radial direction from a slit opening at the grommet's peripheral surface 25 through the grommet to a slit opening at the bore 26. Axially speaking, the slit extends all the way from the grommet's front end 23 to its rear end 24 and is open at both such ends. The slit is bounded on its angularly opposite sides by two slit walls 41 and 42 which, by pulling on them, are resiliently spreadable apart (for a purpose later discussed) to produce a relatively wide gap therebetween.

The grommet 11 has on its front end 23 a radially outwardly projecting stop flange 50 of annular form and integral with, and composed of the same elastomeric material 20 as, the main body 21 of the grommet. Also disposed on such front end is a smaller holding flange 51 spaced rearward of flange 50 and similarly of annular form and constituted of the grommet material 20 and integral with the main body 21 of the grommet. The rear side 52 of flange 50 and the front side 53 of flange 51 define axially opposite sides of an annular outwardly-open groove 55 extending around grommet body 21 between those flanges and having for a bottom 56 a circular cylindrical part of the outside surface 25 of such body. The radially outer part of flange 51 is rounded so that the rear half of that flange has an outer surface 57 which has a forward slant in the sense that, as such surface extends radially outward, it also extends more or less axially forward.

To the rear of holding flange 51, the outer surface of the grommet undergoes a step decrease in diameter as compared to its diameter at groove bottom 56. The portion of the grommet from the rear of that flange to the grommet rear end 24 consists essentially of a circular-cylindrical barrel 60 encircled at its rear end by a raised rounded annular bead 61. Bead 61 and flanges 50 and 51 are made discontinuous around the axis 22 of grommet 11 by the presence therein of slit 40.

The grommet barrel 60 is shown (FIG. 1) as carrying a clamp 70 which of itself (i.e., not as part of the invention hereof) is an article which has been commercially available for years but which, nonetheless will be briefly described herein in order to better understand the invention.

Figure 3:
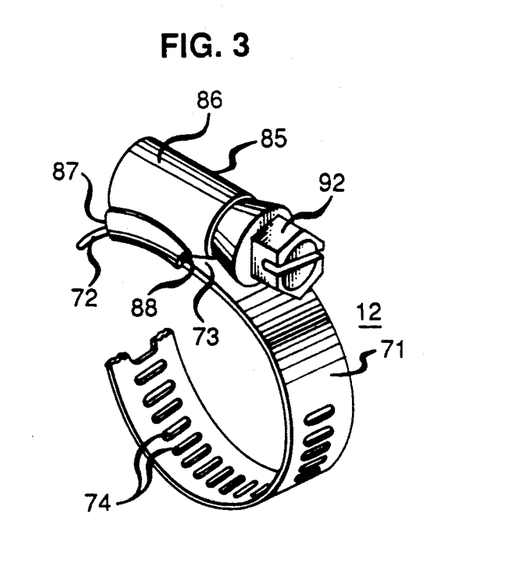
FIG. 3 is a schematic isometric drawing of the clamp component of the FIG. 1 seal.
Figure 4:
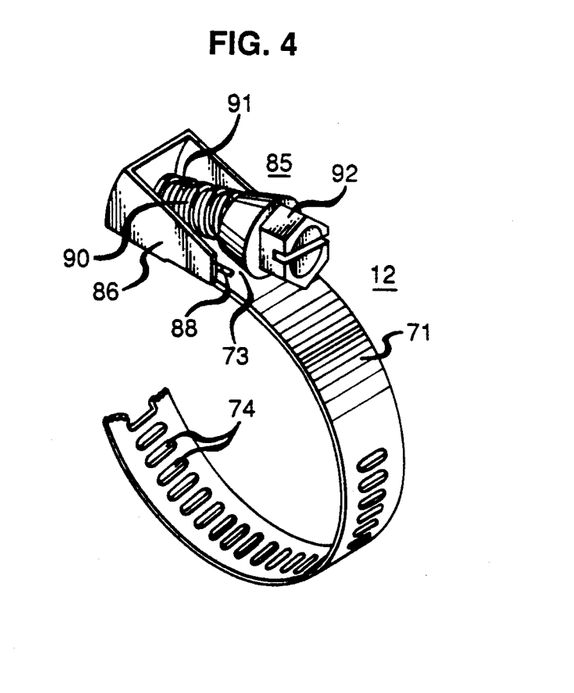
FIG. 4 is another isometric view of such clamp with parts of its housing being broken away to expose to view the worm screw therein.
Figure 5:
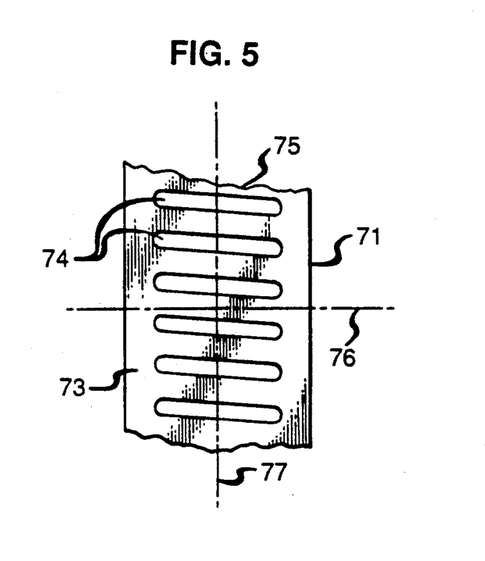
FIG. 5 is an enlarged fragmentary plan view of the free end of the band of the FIG. 3 clamp.

Referring to FIGS. 1 and 3-5, the clamp 70 consists essentially of a belt 71 and a device 85 hereinafter referred to as a "take-up." Belt 71 is in the form of a flexible stainless stell band extending in its length between back and front parts 72 and 73 thereof. The belt 71 has formed therein a series of similar gear slots 74 extending in equidistantly spaced relation in the length of the belt from its front tip 75 rearwardly as far as needed. As best shown by FIG. 5, slots 74 all have the same angular slant or "pitch" relative to a line 76 which is normal to the lengthwise axis 77 of the belt.

The take-up 85 comprises (FIGS. 3 and 4) an elongated housing 86 providing enclosing a compartment which is open at the bottom and has an entrance port 87 and an exit port 88 to and from its interior.

The back part 72 of the belt is received in housing 86 between ports 87 and 88 so that the side margins of part 72 abut downward-facing shoulders (not shown) extending in the housing between those ports on opposite sides of the passage between them. The take-up 85 is fixedly fastened to belt part 72 by fingers (not shown) disposed at the housing's bottom and crimped over and onto belt part 72 to squeeze it between such fingers and the mentioned shoulders.

Forward of part 72, the belt 71 extends out from the take-up's exit port 88 and is curved on itself to pass the belt around grommet barrel 60 and then again through housing 86 (via its ports 87, 88), over the belt's fixed part 72, and then beyond exit port 88 so that a forward portion or tongue 75 of the belt extends freely out from that port. The belt 71 thus has a segment 79 extending around the grommet barrel 60 and coupled at both ends to take-up 85 and forming a loop around such barrel.

The take-up housing 86 has journaled therein a worm screw 90 disposed over (FIGS. 3 and 4) the belt's fixed part 72 and the length overlying it of the movable front part 73 of the belt. Worm screw 90 has a helical thread 91 of which successive portions on the underside of the worm have the same pitch as the gear slots 74 in belt 71 and are received in successive ones of those slots in movable belt part 73 so as to mesh gearwise with that movable part. The worm screw 90 is coupled in rotatably fixed relation with a slotted hexagonal head screw 92 outside the housing and adapted to be adjusted in angular position by a socket wrench or screw driver. Adjusting of the screw in opposite rotary directions will correspondingly drive the worm to selectively let out or take up the belt segment 79 so as to thereby expand or contract, respectively, the loop around grommet 11 formed by that segment.

Figure 6:
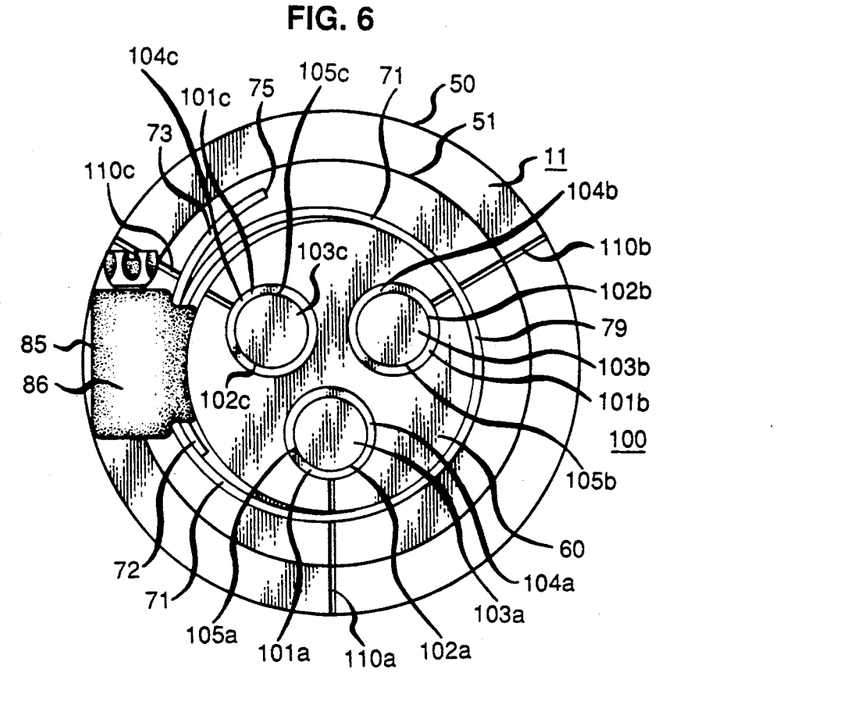
FIG. 6 is a left-side elevation of a cable seal which is modified in relation to the FIG. 1 seal to have three axial bores and three radial slits therein.
Figure 7:
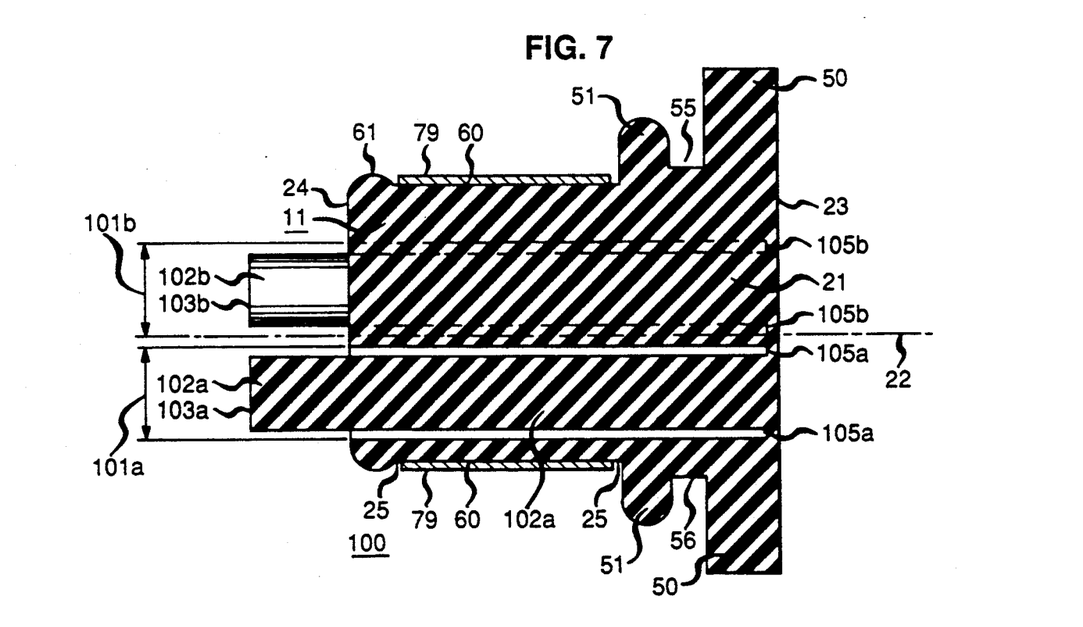
FIG. 7 is a front elevation in cross-section of the FIG. 6 seal.

FIGS. 6 and 7 show a cable seal 100 which is mostly like the FIG. 1 seal but which differs from it as follows. Instead of having only one axial bore in its grommet, the seal 100 has three axial bores 101a, 101b, 101c spaced equiangularly around axis 22 at the same radial distance therefrom. Each of those bores extends axially from the grommet's rear end 24 towards its front end 23 and may, in use, reach that end to provide full passage through the grommet. The three bores have therein respective plugs 102a, 102b, 102c constituted of the grommet material 20 and having exposed portions 103a–103c projecting leftwardly (FIG. 7) from the back end 24 of the grommet body 21. Over most of their lengths, the mentioned plugs are separated by gap type discontinuities 104a–104c from the interior bounding walls of the bores in which they are received. At the right ends, however, of the plugs, those discontinuities are replaced by rings 105a–105c constituted of the grommet material and each joined at its radially outer and inner sides to, respectively the grommet body and the plugs 102a, 102b, 102c so that both those rings and those plugs are integral with the grommet body 21. Each of rings 105a, 105b, 105c is tearable by movement of the corresponding plug caused by axially directed force applied thereto. If, however, they are not torn away, the rings 105a–105c are adapted to provide seals in the axial direction for what would otherwise be air passages in that direction through the grommet via the gaps between bores 101a–101c and the plugs 102a, 102b, 102c, therein.

Corresponding to the bores 101a, 101b, 101c are three slits 110a, 110b, 110c each extending from a slit opening at the grommet's peripheral surface 25 through the grommet body 21 to a meeting at a slot opening with the bore corresponding to that slit. Each of slits 110a–110c extends axially all the way through the grommet 11 and is bounded on angularly opposite sides by two walls which are resiliently spreadable apart in the same way as are the walls of the slit 40 of the FIG. 1 seal. The slits 110a, 110b, 110c are non-intersecting so that the wedges of grommet material contained between adjacent slits remain attached to the main body 21 of the grommet.

Figure 8:
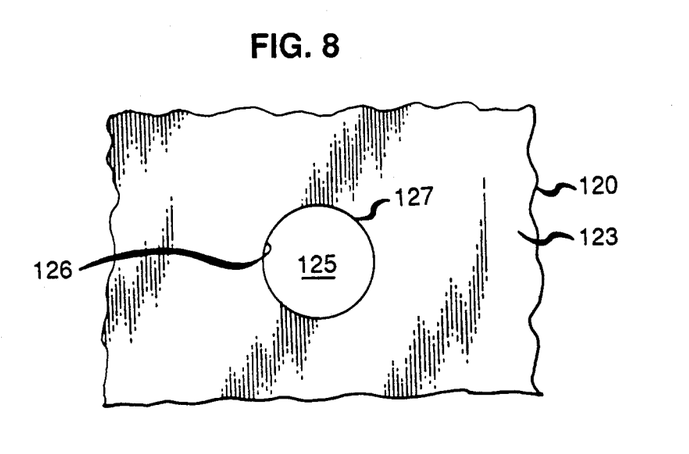
FIG. 8 is a fragmentary view of a partition wall with which the FIG. 1 seal or FIG. 6 seal may be used.
Figure 9:
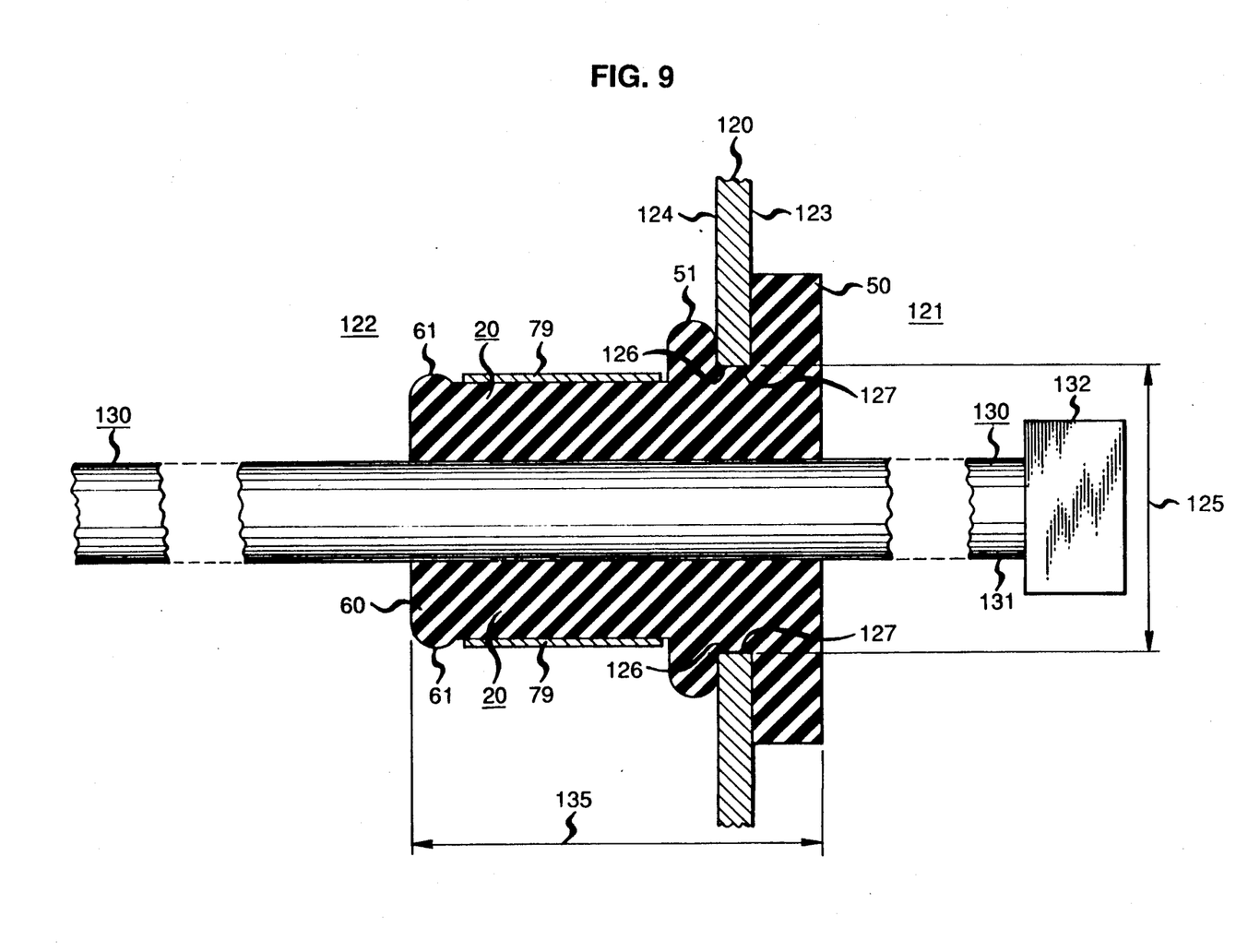
FIG. 9 is a view in cross-section of the FIG. 8 wall and of the FIG. 1 seal when used with that wall.

FIGS. 8 and 9 depict a partition wall 120 separating first and second spatial regions 121, 122 on the front and back sides 123, 124 of the wall. The wall 120 has formed therein a circular opening 125 passing through the wall and providing communication between the regions 121 and 122. Opening 125 is bounded by a circular cylindrical interior rim 126 formed in wall 120 and extending around opening 125. The front side 123 of the wall and the rim 126 meet at a circular edge 127.

USES OF THE EMBODIMENTS

The described cable seals may be used with partition wall 120 in a manner as follows.

Consider first the use of the FIG. 1 device to provide a seal for the passage through the wall opening 125 of the cable 130 which is shown in FIG. 9. That cable may, near wall 120, be unbroken and of uniform diameter. In FIG. 9, however, cable 130 is depicted as being broken by virtue of having a free end 131, and there is shown as attached to that end a schematically represented connector 132 having a substantially greater diameter than the cable.

To implement the described seal, if the clamp 12 is then on grommet 11, the clamp is removed from the grommet (by loosening, if need be, the belt segment 79 enough to permit it to be axially slid rearwardly past the grommet bead 61 and, thus, off the grommet) so that nothing blocks the outside opening of the radial slit 40.

The mutually separated grommet 11 and clamp 12 are then placed near wall 120 in respectively the front and rear regions 121 and 122 on opposite sides of that wall.

Next, the plug 30 in grommet bore 26 is manipulated by grasping the plug at its free end 35 and pulling on that end with leftward axially directed force to produce a leftward moving of the plug (relative to grommet body 21) and a consequent tearing of the material of ring 31 (joining the plug and grommet body) until the plug is fully released from the grommet body and bore 26 becomes a "through" bore extending fully through the grommet. The plug is then moved by hand out of the bore to clear it.

In such case where the plug is removed from the bore in the course of use of the seal 10, the ring 31 performs the useful function that it maintains the plug 30 assembled with the rest of the seal until it is determined whether or not a cable will be passed through that particular seal.

The passage of cable 130 through seal 10 is effected by moving the free front end 131 of the cable from left to right (FIG. 9) to pass it first, in region 122, through the loop formed by belt segment 79 of clamp 12, then through the opening 125 in wall 120, and then beyond that opening for some distance into region 121. The rest of the cable follows, of course, after its free end 131.

Figure 10:
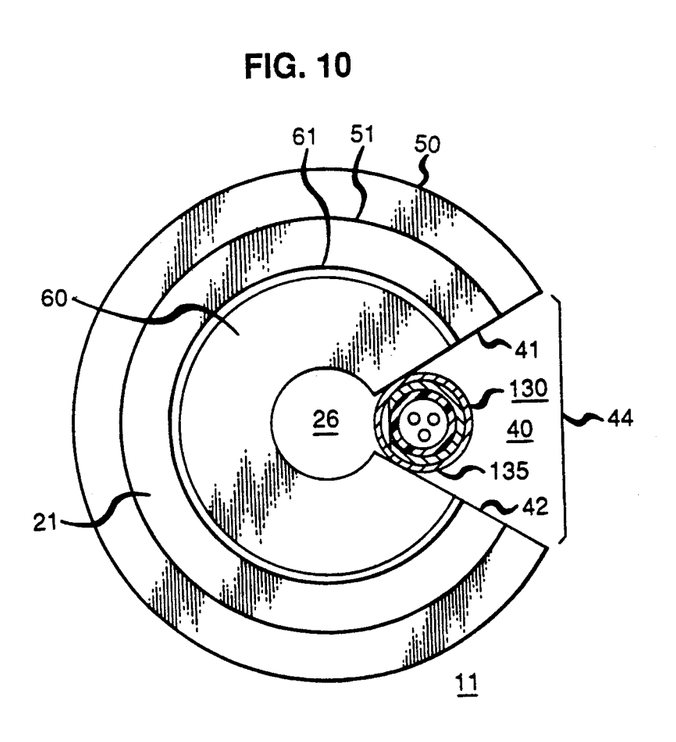
FIG. 10 is a schematic left-side elevation of the FIG. 1 seal showing the configuration assumed thereby at a stage in the use of such seal.

With some length of the cable in front region 121, the grommet 12 is deformed by hand or a tool to spread apart the walls 41, 42 of the grommet's radial slit 40 to produce between these walls the large wedge-shaped gap 44 shown in FIG. 10. Then, while holding these walls so spread apart, the cable 130 is guided so that a portion 135 (FIG. 9) of cable 130 is disposed directly outward of the enlarged outer opening of slit 40. That cable portion 135 is then moved radially through slit 40 into bore 26 to become inserted therein just as a hot dog is inserted into a bun. FIG. 10 shows the cable portion 135 as so inserted into the grommet 11 from its side rather than from an end thereof. It will be noted that, by providing for such side entry of the cable 130 into the grommet, it is possible to obtain passage of the cable therethrough even though such cable has at its free end 131 a connector 132 or other object of such large diameter that passage of the cable through the grommet by end entry of the cable therein would be impossible.

Entry of the cable into the grommet from its side rather than an end thereof may be desirable for reasons other than that noted above. For example, the cable may be so fragile that attempting to pass it through the grommet endwise might damage a part or parts in the cable (e.g., optical fibers). Further, the cable may not be stiff enough to permit it to overcome without difficulty the frictional impedance to its movement which will be encountered in seeking to pass the cable endwise through the grommet bore. The same difficulty in effecting endwise entry would be encoutered to a greater degree if the cable is oversize in relation to the bore diameter.

The cable 130 shown in FIG. 10 as being inserted into the bore 26 of grommet 11 is a fiber optic cable comprising an outside plastic jacket, a metallic sheath inside that jacket, a plastic tube in that sheath and a multiplicity of optical fibers contained in the plastic tube. The cable seals disclosed herein are not, however, limited in use to fiber optic cables but may also be used, for example without restriction, with electrical cables and thick insulated electrical wires, hydraulic cables and other kinds of cable or wire.

Once cable portion 135 has become so received in grommet bore 26, the forcible holding apart of the walls 41, 42 of the slit 40 is discontinued. Thereupon and because of the resiliency of the material 20 of the grommet, these walls tend to spring back to restore the original spacing, if any, between them and to relieve such material of the stress induced therein by those walls having been spread apart. If, however, cable portion 135 is slightly oversize in diameter relative to the diameter of bore 26, the slit walls 41, 42 in tending to spring back may end up slightly further apart then they were originally.

It will be recalled that the foregoing steps have been taken with the grommet 11 being located entirely in the region 121 on the front side 123 of the wall 120. As the next step, the grommet 11, with the cable portion 135 therein, is moved right to left, rear end first, to advance the grommet into wall opening 125 and through it until further rearward movement of the grommet is stopped by the coming into contact of the grommet's stop flange 50 with the front side 123 of the wall 120. Considerable resistance will be encountered in the course of so moving the grommet when its holding flange 51 reaches wall 120 so that the edge 127 and rim 126 of hole 125 contact the rear surface 57 of that flange, such resistance being caused by the fact that flange 51 when unstrained has a greater diameter than the wall opening 125. As, however, the grommet is forcibly urged rearward, the radially outward forward slant of its holding flange surface 57 causes the hole's edge 127 and rim 126 engaging that surface to have thereon a wedging action productive of a force on that surface which has a radially inward component of force and which accordingly, deforms the resilient flange 51 to, in effect, "flatten" it to reduce its diameter enough that the flange will pass through wall opening 125. Such radially inward flattening of the flange is aided by the fact that grommet 11 is stepped down in diameter on the rear side of flange 51 to permit some of the resilient stress induced in flange 51 by the mentioned wedging action to be relieved by axial bulging rearward of that rear part of flange 51 which is inward of wall opening rim 126. Once flange 51 passes all the way through hole 125, the flange springs back to its original diameter to be as shown in FIG. 9.

At this reached point, grommet flanges 50 and 51 are on opposite sides of wall 120 and the part of wall 120 bordering opening 125 therein is seated in the groove 55 between these flanges with the bottom 56 of such groove being in flush contact with circumferential wall or rim 126 of the wall opening 125. The diameter of that opening and the unstrained diameter of that groove bottom are matched to each other so that, when the grommet has its final axial position in such opening (as shown in FIG. 9), groove bottom 56 has a slight interference fit with opening rim 126 to thereby provide a seal between the grommet and wall 120.

When cable portion 135 becomes clamped within the grommet (as soon to be described), stop flange 50 relieves the cable 130 to the right of the grommet of any strain produced in the cable to the left of the grommet by axial pulling force. The holding flange 51 prevents the grommet from being accidentally displaced in the left-to-right direction in opening 125 by inadvertent rightward axial force applied to the grommet.

The previously separated clamp 12 is now replaced on grommet 11 by slipping the segment 79 of clamp belt 71 over the bead 61 of the grommet and onto its barrel 60 to extend as a loop around it. The drive screw 92 of take-up 85 of the clamp is then turned to shorten belt segment 79 to contract the loop formed by it around grommet barrel 60 so as to produce radially inward displacement of the segment around its length, and to cause such segment at all parts around the barrel to exert active force directed radially inward on the elastomeric material 20 of the barrel. Such circumferentially distributed radially inward active force pressurizes the grommet material to have the following sealing effects.

First, the internal pressure in such material tends to displace it radially inward around the bounding wall 32 of bore 26 so as to produce over the axial extent of barrel 60 a pressure contact between that wall and the exterior of cable portion 135 to thereby seal in the axial direction the discontinuity through grommet 11 between that wall and cable 130. Such pressure contact also produces a firm frictional gripping of the cable 130 by the grommet 11.

Second the internal pressure generated in material 20 operates over the axial extent of barrel 60 to urge together the walls 41, 42 of the slit 40 into pressure contact to thereby seal in the axial direction the discontinuity through the grommet 11 provided by that slit. Hence, the force exerted by clamp 12 on grommet 11 provides for the passage of cable 130 through the opening in wall 120 a sealing of potential leakage internally through the grommet just as the interference fit between the grommet's outside surface 25 and the rim 126 of wall opening 125 provides a sealing of potential leakage externally of the grommet between it and wall 120.

The grommet material 20 is, although elastomeric, not a hydrostatic pressure transmitting medium but, on the contrary has substantial strength in shear and tension. In such case, it is deemed preferable that the active force by which the material is pressurized be in-line with the force responsively exerted by the pressurized material to produce the desired sealing effect because the presence of such "in-line" relationship will likely more efficiently convert such initial active force on the material into pressure sealing force exerted by the material than would be realized if, say, such initial active force were normal to such sealing force. Such an in-line relationship exists between the initial active force exerted by clamp 12 on grommet barrel 60 and the sealing force exerted by the material of that barrel on the exterior of cable 130. An in-line relationship of such sort also exists between the active force exerted by that clamp on such material and the force exerted by that material on slit walls 41, 42 to urge them into pressure contact. Such in-line relation is present because the initial active distributed forces exerted by the clamp to produce that pressure contact can be considered replaced by concentrated resultant forces having oppositely directed components of force in line with the forces extended by the pressurized material 20 in urging the walls 41, 42 together. Whether or not, however, it is the presence of such in-line relationship which is the primary contributor to the efficiency of sealing of the cable seal 10, the fact is that such seal can provide effective sealing for a substantially greater range of variation in diameter of the cable passing through the grommet then can seals of the kind shown in the mentioned U.S. Pat. No. 4,322,435 in which initial active pressurizing force is applied axially to the gasket referred to in that patent in order for the gasket to produce radially inward force on the cable passing therethrough.

The tightening as described above of the clamp 12 on the grommet 11 completes the installation of the device 10 of FIGS. 1 and 2 as a seal for the passage of a cable through an opening in a wall or other structural means separating two regions of space. Another consequence of such tightening is that the resulting pressurizing of the grommet material tends to produce a slight bulging of such material beneath the bottom 56 of the grommet groove 55 so as thereby to increase the pressure contact between that bottom and the wall 120 and the effectiveness of the seal made therebetween.

An alternative use of the device 10 is, without the insertion of any cable therein, merely to close a wall opening such as opening 125. To implement that use, the device is handled the same way as described above except that the steps of removing plug 30 from bore 26 (with tearing of ring 31) and of inserting the cable in the bore are omitted. The grommet 11 without clamp 12 may be used for that purpose to provide for such opening 125 a closure which is a relatively good seal therefor, and particularly so if the radial slit through the grommet is pinched closed by the fit of the grommet in the opening. Preferably, however, the clamp 12 is used with the grommet 11 as described above to better assure that the opening will be well sealed. It is, of course, a convenience and advantage to be able to use the same device 10 first as a closure for an opening through a wall or other means until a cable is passed through such opening and then as a seal for such passage.

Considering now the uses of the three-bore device 100 shown in FIGS. 6 and 7, the way in which such device is manipulated to implement its use as seal for the passage of three cables through opening 125 (or other opening) will be self evident from the foregoing description of how device 10 is handled to implement such use. In connection with such use of device 100, it is noted that, if less than all of its three bores are filled with functioning cables passing through the device, the plugs 102 and rings 105 originally in the one or more other bores should preferably be retained therein (or dummy sections of cable or other plugging means substituted therefor) in order to assure that such one or more other bores will be sealed and to provide more even distribution throughout the grommet material of the pressure engendered therein by the tightening of clamp 12. The device 100 may, like the device 10, be used merely to close an opening into which it is inserted by refraining from passing any cable through device 100 and by retaining intact therein all of the plugs 102 and all of the rings 105.

The above described embodiments being exemplary only, it is to be understood that omissions therefrom, additions thereto and modifications thereof can be made without departing from the spirit of the invention and that, accordingly, the invention is not to be considered as limited save as is consonant with the recitals of the following claims.

What is claimed is:

1. An assemblage comprising:
a partition wall separating first and second regions of space on the front and back sides of said wall, said wall having therein a circular opening passing through said wall to communicate between said regions, a grommet comprising a resilient body comprising elastomeric material and having an axis and axially spaced front and rear ends and a peripheral surface extending between said ends and angularly around said axis, said grommet being received in said opening to extend axially outward from the front and rear sides of said wall into said first and second regions, and said grommet having therein at least one axial bore, a section of cable having a lengthwise central portion received in said bore and other parts disposed on axially opposite sides of said central portion and extending into said regions from the front and rear ends of said grommet, said central cable portion being contacted in said bore by the interior wall thereof to be frictionally gripped by said wall and to provide a pressure sealing in said bore of said cable portion, a radially outwardly projecting stop flange disposed at the front end of said grommet to be on the front side of said wall next to part thereof adjacent said opening, said stop flange being adapted, under rearwardly directed axial pulling force on said cable, to bear with pressure against said wall to provide strain relief for said cable forward of the front end of said grommet, and a radially outwardly projecting holding flange disposed on the front end of said grommet rearward of said stop flange to be on the rear side of said wall next to part thereof adjacent said opening, said holding flange being adapted to impede forward axial movement of said grommet relative to said wall.

2. An assemblage according to claim 1 in which said stop flange and holding flange are integral with said grommet body and comprise said elastomeric material and are annular flanges which extend around said axis, and which respectively define axially opposite walls of an annular groove also extending around said grommet body, and in which a portion of said partition wall rimming said opening is seated in said groove in pressure contact with said grommet surface to provide a pressure seal for the interface between said partition wall and said grommet.

3. An assemblage according to claim 2 in which said assemblage further comprises clamp means girdling said peripheral grommet surface rearward of said holding flange to form a loop around said surface, and effective by contraction of said loop to pressurize said material in said grommet to thereby urge by such pressurizing such interior wall of said bore against said cable therein and said peripheral surface of said grommet against such portion of said partition wall.

* * * * *